Figure 1:
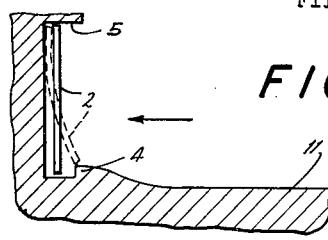

May 8, 1962 K. SCHAEFER 3,033,074
FILM GUIDE STRUCTURE FOR CINEMATOGRAPHIC APPARATUS
Filed Dec. 21, 1956

INVENTOR.
Knut Schaefer
BY Michael S. Striker
agt.

United States Patent Office 3,033,074
Patented May 8, 1962

3,033,074
FILM GUIDE STRUCTURE FOR CINEMATOGRAPHIC APPARATUS
Knut Schaefer, Gotthelfstr. 65, Munich, Germany
Filed Dec. 21, 1956, Ser. No. 629,903
Claims priority, application Germany Dec. 24, 1955
4 Claims. (Cl. 88—17)

The present invention relates to cinematographic apparatus.

More particularly, the present invention relates to that portion of a cinematographic apparatus which guides film for movement from a supply spool to a take-up spool.

Conventional film guide structure of this type includes elements such as toothed rollers whose teeth extend into the perforations of the film. Such rollers are necessarily wider than the film, and with conventional structure of this type a considerable amount of skill and patience is required to thread the film properly in the apparatus.

One of the objects of the present invention is to provide a film guiding structure of the above type which is far simpler than the conventional film guiding structure while at the same time guiding the film properly.

Another object of the present invention is to provide a film guiding structure to which the film can be easily and quickly applied in a foolproof manner even by an inexperienced operator.

A further object of the present invention is to provide a film guiding structure which does not require a pressure plate to be held by the operator away from its operating position during threading of the film.

With the above objects in view the present invention mainly consists of a cinematographic apparatus which includes a wall having a substantially flat surface adapted to receive a supply spool and a take-up spool. A means is carried by the wall for guiding these spools for rotation respectively about a pair of parallel axes which are normal to the wall surface. A first film guide member is adapted to locate the film in a predetermined plane during movement thereof between the spools, and this first guide member has a film guiding surface normal to and extending from the flat surface of the wall, the film guiding surface having a width corresponding to the width of the film. Second and third film guide members are provided for guiding the film from the supply spool to the first guide member and from the latter member to the take-up spool, respectively, the second and third guide members being located between the film guiding surface of the first member and a plane which includes the parallel axes of rotation of the spools. The second and third guide members are fixed to the wall and extend from the flat surface thereof, and the second and third guide members each have a width which is a fraction of the width of the film guiding surface of the first film guide member.

Figure 2:
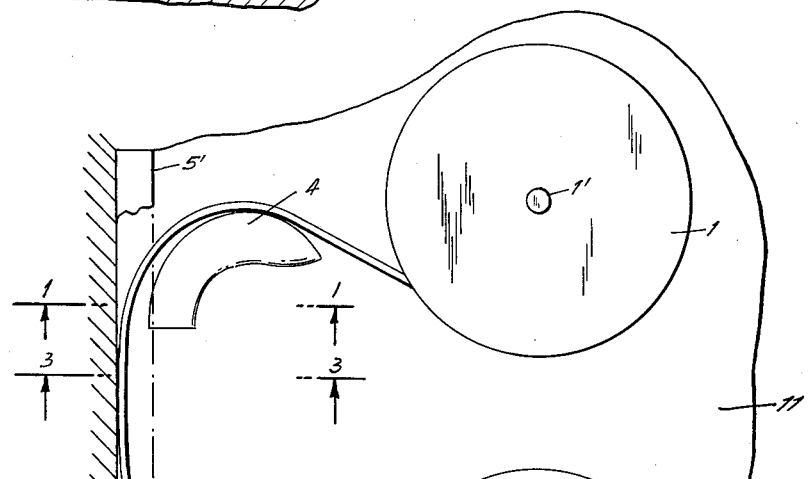
Figure 3:
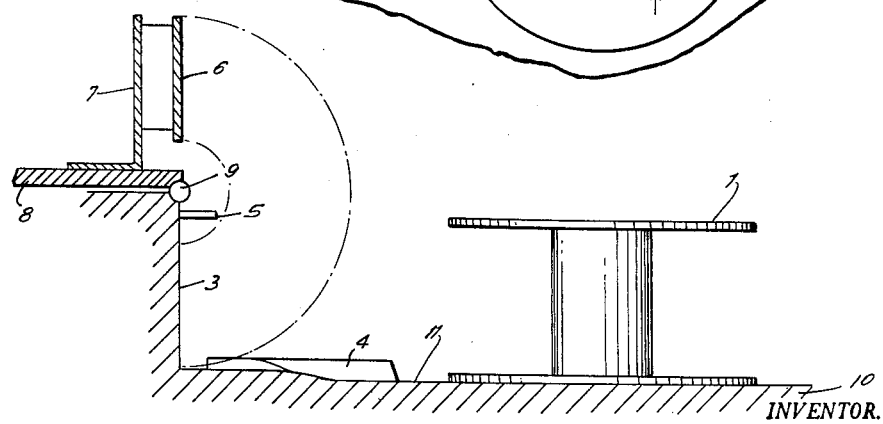

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary sectional elevational view illustrating in a partly diagrammatic manner part of the film guiding structure of the present invention, FIG. 1 being taken along line 1—1 of FIG. 2 in the direction of the arrows;

FIG. 2 is a partly diagrammatic, partly sectional, view of the structure of the invention as it appears when looking toward the surface of a wall which carries the film spools and which engages an edge of the film; and FIG. 3 is a partly diagrammatic sectional elevational view taken along line 3—3 of FIG. 2 in the direction of the arrows, FIG. 3 showing in addition to the structure of FIG. 2 a diagrammatically illustrated pressure plate means and a means for moving the pressure plate means to and from its operating position, the pressure plate means being shown in FIG. 3 in its inoperative position.

Referring now to the drawings, the structure of the invention includes a wall 10 (FIG. 3) having a substantially flat surface 11. A pair of pins or the like 1' are carried by the wall 10 and extend normally from the surface 11 thereof, these pins 1' being adapted to support, in a known way, the supply and take-up spools 1 for rotation about their axes, respectively, these spools being received by the surface 11, as is evident from FIGS. 2 and 3.

The film 2 is guided during exposure for movement in a predetermined plane determined by a film guide member 3 whose right surface, as viewed in the drawings, forms a film guiding surface for engaging and guiding the film for movement in the film plane. The guide member 3 is formed in a known way with an unillustrated exposure aperture, and a claw member for moving the film has a tooth which extends through an unillustrated opening of the guide member 3 into engagement with the film perforations for transporting the film also in a known way. It will be noted that the plane of the film guiding surface of the film guide member 3 is perpendicular to the plane of surface 11 of the wall member 10.

In accordance with the present invention a pair of additional film guide members 4 are provided in the space between the film guide member 3 and the plane which includes the axis of rotation of the spools 1. These film guide members 4 are fixed to the wall 10 as by being formed integrally therewith, and they extend from the wall surface 11. As is apparent from FIG. 2, the film guide members 4 respectively have arcuate film guiding surfaces, and in accordance with the present invention the members 4 are thickest at their film guiding surfaces and gradually diminish in thickness from these film guiding surfaces in a direction toward the plane which includes the axes of rotation of the spools 1. The film guiding surface of the film guide member 3 has a width corresponding to the width of the film 2, as is particularly apparent from FIG. 1, and in accordance with the present invention the film guide members 4 have a maximum width or thickness which is but a fraction of the width of the film guiding surface of member 3.

An additional guide member 5 is provided, this guide member 5 being fixed to and extending normally from the guide member 3 and being parallel to the surface 11. The guide member 5 is adapted to engage the edge of the film opposite to the edge thereof which engages the surface 11. The member 5 is broken away in FIG. 2 in order to clearly illustrate the structure thereunder, but the dotted line in FIG. 2 shows the location of the free edge 5' of member 5, and it is apparent from FIG. 2 that the guide member 5 extends over the space between the guide member 3, on the one hand, and the guide members 4, on the other hand.

In order to thread the film, it is only necessary to place one edge of the film against the guide member 5, and then to push the other edge of the film up and over the guide members 4 so that the film snaps into the space between the latter guide members and the guide member 3, FIG. 1 showing the film in dotted lines while it is being pushed in the direction of the arrow of FIG. 1 into the space between guide members 4 and guide member 3. The free end of the film strip which extends from the supply spool can be connected to the take-up spool either before or after the film is placed between surface 11 and guide member 5, in the picture taking position between film guide member 3, on the one hand, and film guide members 4, on the other hand.

With the structure of the invention it is unnecessary to hold a pressure plate against the force of a spring or the like away from its operating position while the film is threaded in the camera. It is believed to be evident that the structure of the invention also may be used in a projector. Thus, referring to FIG. 3, a diagrammatically illustrated pressure plate means 6 is shown in its inoperative position. In this position the pressure plate means does not in any way interfere with the threading of the film, and it is unnecessary for the operator to give the pressure plate means any consideration whatsoever during threading of the film. The pressure plate means 6 is connected by a bracket 7 to a camera cover 8 which is hinged to the camera at 9 for turning movement about an axis parallel to the guide member 5. Thus, elements 7—9 form a means for turning the pressure plate means 6 to and from its operating position. The operating position of the pressure plate means 6 is displaced by 180° from the position of pressure plate means 6 shown in FIG. 3 about the turning axis formed by the hinge 9, and the pressure plate means 6 in its operating position is located closely adjacent to the film guiding surface of the film guide 3 on the side of the plane of this surface opposite to that on which the pressure plate means is located in the position shown in FIG. 3. The pressure plate means 6 includes a plate shown at the right in FIG. 3 which is yieldably and resiliently movable toward the bracket 7 so that the pressure plate means urges the film into engagement with the guide 3. As the pressure plate means 6 is turned into its operating position, the guide member 5 becomes located between the pressure plate means 6 and the cover 8 and extends from the guide member 3 toward the bracket 7, the parts being designed so that the pressure plate means clear the guide member 5 during turning of the pressure plate means to and from its operating position. The spacing between the guide members 4 is such that the pressure plate means 6 moves through the space between guide members 4 as the pressure plate means turns to and from its operating position, and in its operating position a part of the pressure plate means is located between the guide members 4, and the remainder of the pressure plate means extending from the latter toward the guide member 3. Thus, with the structure of the invention, the closing of the cover 8 automatically places the pressure plate means in its operating position.

It will be understood that each of the elements described above, or two or more together, may also find a useful application in other types of cinematographic apparatus differing from the types described above.

While the invention has been illustrated and described as embodied in film guide structure for cinematographic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cinematographic apparatus, in combination, a wall having a substantially flat surface which is adapted to receive a supply spool and a take-up spool; means for mounting a supply spool and a take-up spool on said substantially flat surface of said wall for rotation respectively about a pair of parallel axes which are normal to said wall surface; a first film guide member adapted to locate the film in a predetermined plane during movement thereof between said spools, said first member having a film guiding surface normal to and extending from said flat surface of said wall and said film guiding surface having a width corresponding to the width of the film; second and third loop forming film guide members for guiding the film in the shape of a loop from the supply spool to said first guide member and from said first member to said take-up spool, respectively, said second and third loop forming members being located between said film guiding surface of said first member and a plane including said pair of parallel axes and said second and third loop forming members being fixed to said wall and extending from said flat surface thereof, said third and second loop forming members each being spaced from said film guiding surface and having a width which is a fraction of the width of said film guiding surface of said first film guide member; a fourth film guide member parallel to said wall surface, spaced from the same by a distance approximately equal to the width of said film guiding surface of said first guide member, having a guiding surface directed toward the spaces between said first member, on the one hand, and said second and third loop forming members, on the other hand, and said film guiding surface of said fourth member being transverse to the film guiding surface of said first member; pressure plate means having an operative position located at least partly in the space between said second and third loop forming film guide members and said means for mounting a supply spool and a take-up spool, and an inoperative position located outside of said space; and means supporting said pressure plate means for movement between said operative and said inoperative positions thereof, whereby after movement of said film pressure means from said operative to said inoperative position thereof a film may be properly located in the apparatus by pushing a portion of the film located between the supply spool and the take-up spool over said second and third guide member against the film guiding surface of said first guide member while the ends of the film are already attached to said spools, respectively.

2. In a cinematographic apparatus, as recited in claim 1, said second and third loop forming guide members respectively having film guiding surfaces which engage and guide the film and said second and third loop forming guide members being of a maximum thickness at said film guiding surfaces thereof and gradually diminishing in thickness from said latter film guiding surfaces toward the plane which includes said pair of parallel axes.

3. In a cinematographic apparatus, in combination, a wall having a substantially flat surface which is adapted to receive a supply spool and a take-up spool; means for mounting a supply spool and a take-up spool on said substantially flat surface of said wall for rotation respectively about a pair of parallel axes which are normal to said wall surface; a first film guide member adapted to locate a film in a predetermined plane during movement thereof between said spools, said first film guide member having a film guiding surface normal to and extending from said flat surface of said wall, and said film guiding surface having a width corresponding to the width of the film; second and third loop forming film guide members for guiding the film in the shape of a loop from the supply spool to said first film guide member and from said first film guide member to said take-up spool, respectively, said second and third loop forming film guide members being located between said film guiding surface of said first film guide member and a plane including said pair of parallel axes and said second and third loop forming film guide members being fixed to said wall and extending from said flat surface thereof, said second and third loop forming film guide members being each spaced from said film guiding surface and having each a width which is a fraction of the width of said film guiding surface of said first film guide member and said second and third loop forming film guide members being spaced from each other by a predetermined distance in the direction of movement of the film along said film guiding surface of said first film guide member; pressure plate means having an operating position located partly in the space between said second and third loop forming film guide members and said pressure plate means pressing film against said film guiding surface of said first film guide member when said pressure plate means is in its operating position; means supporting said pressure plate means for turning movement to and from its operating position, so that when said pressure plate means is out of its operating position film may be placed between said first film guide member, on the one hand, and said second and third loop forming film guide members, on the other hand, and when said pressure plate means is turned into its operating position it engages a film and presses the same against said first film guide member; and a fourth film guide member parallel to said wall surface, spaced from the same by a distance approximately equal to the width of said film guiding surface of said first film guide member, having a film guiding surface directed toward the spaces between said first film guide member, on the one hand, and said second and third loop forming film guide members, on the other hand, and said film guiding surface of said fourth member being transverse to the film guiding surface of said first film guide member.

4. In a cinematographic apparatus, as recited in claim 3, said means supporting said pressure plate means being in the form of a cover turnable to a closed position for locating said pressure plate means in its operating position.

References Cited in the file of this patent

UNITED STATES PATENTS

| | | |
|---|---|---|
| 1,594,895 | Merle | Aug. 3, 1926 |
| 2,051,206 | Fairbanks | Aug. 18, 1936 |
| 2,103,369 | Howell | Dec. 28, 1937 |
| 2,126,341 | Nagel | Aug. 9, 1938 |
| 2,319,530 | Bolsey | May 18, 1943 |
| 2,327,776 | Fairbanks et al. | Aug. 24, 1943 |
| 2,352,181 | Bolsey | June 27, 1944 |
| 2,490,920 | Roisman | Dec. 13, 1949 |
| 2,526,647 | Foster et al. | Oct. 24, 1950 |
| 2,703,034 | Thomas | Mar. 1, 1955 |

FOREIGN PATENTS

| | | |
|---|---|---|
| 510,529 | Great Britain | Aug. 2, 1939 |
| 673,065 | Great Britain | June 4, 1952 |